(12) United States Patent
Bastien

(10) Patent No.: US 11,072,204 B2
(45) Date of Patent: Jul. 27, 2021

(54) INTEGRATED ABRASIVE MATERIAL DISPENSING SYSTEM FOR A WHEELED VEHICLE

(71) Applicant: Tommy Lee Bastien, Sainte-Anne-des-Plaines (CA)

(72) Inventor: Tommy Lee Bastien, Sainte-Anne-des-Plaines (CA)

( * ) Notice: Subject to any disclaimer, the term of this patent is extended or adjusted under 35 U.S.C. 154(b) by 120 days.

(21) Appl. No.: 16/583,188

(22) Filed: Sep. 25, 2019

(65) Prior Publication Data

US 2020/0108662 A1 Apr. 9, 2020

(30) Foreign Application Priority Data

Oct. 6, 2018 (GB) ..................................... 1816331

(51) Int. Cl.
*B60B 39/10* (2006.01)
*B60B 39/02* (2006.01)
*E01C 19/20* (2006.01)
*B60B 39/06* (2006.01)

(52) U.S. Cl.
CPC ............ *B60B 39/10* (2013.01); *B60B 39/022* (2013.01); *B60B 39/025* (2013.01); *B60B 39/06* (2013.01); *E01C 19/2025* (2013.01)

(58) Field of Classification Search
CPC ..... B60B 39/022; B60B 39/025; B60B 39/06; B60B 39/10; E01C 19/2025; E01H 10/007
See application file for complete search history.

(56) References Cited

U.S. PATENT DOCUMENTS

| | | | |
|---|---|---|---|
| 984,405 A | 2/1911 | White | |
| 1,338,640 A * | 4/1920 | Littell | B60B 39/06 291/28 |
| 1,389,544 A | 8/1921 | Butler | |
| 1,555,153 A | 9/1925 | Petrus | |
| 1,755,823 A | 4/1930 | Hopkins | |
| 1,781,120 A | 11/1930 | Martin et al. | |
| 2,182,969 A | 12/1939 | Madigan | |
| 2,730,389 A | 1/1956 | Sherman | |
| 2,863,687 A | 12/1958 | Benis et al. | |
| 3,034,816 A | 5/1962 | Thompson | |
| 3,156,492 A | 10/1964 | Murray | |
| 3,774,945 A | 11/1973 | Lee et al. | |
| 3,827,736 A * | 8/1974 | Mango | B60B 39/10 291/20 |
| 3,926,377 A * | 12/1975 | Johnson | A01C 15/04 239/655 |

(Continued)

*Primary Examiner* — Ryan A Reis

(57) ABSTRACT

An integrated abrasive dispensing material system for a wheeled vehicle is provided. The system having a hopper for dispensing the abrasive material into a dispenser, and then out dispensing pipe at the bottom of the dispenser. The dispenser has a rotating brush roll actuated via a motor, the rotating brush roll having a plurality of bristled flaps extending radially from a cylinder positioned inside the hollow dispenser. The flaps ensure a constant and calculated flow of abrasive material. The flap also make contact with the interior perimeter of the dispenser keeping the abrasive material inside the dispenser in an environment that prevents moisture and cold air flow from entering the dispenser which could cause the abrasive material to form blocks that could jam the system.

9 Claims, 5 Drawing Sheets

(56) References Cited

U.S. PATENT DOCUMENTS

| | | | | |
|---|---|---|---|---|
| 4,316,625 A | * | 2/1982 | Goon | B62D 37/00 |
| | | | | 222/368 |
| 5,368,192 A | * | 11/1994 | Ransom, II | A01K 5/0291 |
| | | | | 221/277 |
| 5,582,441 A | | 12/1996 | Frost | |
| 6,050,743 A | * | 4/2000 | Medinger | A01C 15/006 |
| | | | | 111/178 |
| 6,659,683 B1 | * | 12/2003 | Yamamoto | E01H 10/007 |
| | | | | 404/19 |
| 2002/0008120 A1 | * | 1/2002 | McNally | E01C 19/2025 |
| | | | | 222/175 |
| 2012/0090287 A1 | * | 4/2012 | O'Daniel | A01C 15/18 |
| | | | | 56/16.8 |
| 2014/0263764 A1 | * | 9/2014 | Outcalt | E01H 10/007 |
| | | | | 239/687 |

* cited by examiner

INTEGRATED ABRASIVE MATERIAL DISPENSING SYSTEM FOR A WHEELED VEHICLE

CROSS-REFERENCE TO RELATED APPLICATIONS

The present application claims priority to United Kingdom Patent Application serial number GB1816331.1, filed on Oct. 6, 2018, the disclosure of which is hereby incorporated in its entirety at least by reference.

BACKGROUND OF THE INVENTION

1. Field of the Invention

The present invention generally relates to dispensing system but more particularly to an integrated abrasive material dispensing system for a wheeled vehicle.

2. Description of Related Art

Every year, for nearly five consecutive months in certain countries, road conditions are difficult because of ice and snow. Due to the difficult road conditions, accidents are increased by 30%. Even with the best winter tires, good traction may not be guaranteed. Anti-lock braking systems (ABS) are an extremely useful invention that improves handling when locking wheels. However, this system alone is not optimal for helping braking on slippery roads. Thus, in general these roads are cleared from snow and abrasive materials are laid on roads to prevent and remove snow and ice. However, it takes time to do the clearing and spreading abrasive materials on roads, especially smaller country roads which are processed after having done the highways and other main roads. Aside from using traction aids after a vehicle gets stuck or carrying a bag of abrasive in the trunk, which has limited use aside from spreading some abrasive materials in order to get going, there is not practical system that is always dependable to spread abrasive on demand.

The main problems caused by bad winter roads are the inability to brake within a reasonable distance and the loss of traction during acceleration. A vehicle's anti-skid system can help to a certain extent, but it can lead to smothering the engine to avoid a loss of control. This can be rather dangerous in some situations, such as when a driver want to make a turn on a busy road and the traction is not enough while the driver is in the middle of the street with a motor turning at low speed. Consequently, there is a need for an integrated abrasive material dispensing system for a wheeled vehicle.

BRIEF SUMMARY OF THE INVENTION

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

In one aspect of the invention, an integrated abrasive material dispensing system for a wheeled vehicle is provided, comprising a hollow dispenser; a rotating brush roll having a plurality of flaps, wherein the rotating brush roll is positioned inside the hollow dispenser and is actuated via a motor; a dispensing pipe attached to a bottom portion of the hollow dispenser; and, a hopper configured to feed abrasive material into the hollow dispenser, wherein the rotating brush controls the flow of the abrasive material exiting the dispensing pipe.

In one embodiment, the rotating brush roll includes a cylinder and each of the plurality of flaps extend radially from the cylinder. In one embodiment, the plurality of flaps is four bristled flaps. In one embodiment, each flap of the plurality of flaps are configured to flex around clumps of abrasive material such that the rotation of rotating brush roll is not impeded. In one embodiment, the hollow dispenser has an inner perimeter surface and the distal portions of the plurality of flaps make contact with the inner perimeter surface such that a tight seal is formed preventing abrasive material from exiting the dispensing pipe when the rotating brush roll is not rotating.

In one embodiment, the integrated abrasive material dispensing system is configured to be attached to the vehicle's chassis. In one embodiment, a tank connected to the hopper is provided. In one embodiment, the tank is constructed from a flexible and insulating material to prevent condensation of the abrasive material.

In one embodiment, a control box configured to control the integrated abrasive material dispensing system is provided, wherein the control box is positioned inside the vehicle. In one embodiment, the control box includes an indicator light configured to alert a driver of the vehicle that a filling abrasive material is required. In one embodiment, the control box includes a motherboard having a timer, the motherboard in electrical communication with an ammeter clamp, wherein the ammeter clamp is installed around a motor wire of an ABS pump of the vehicle such that the ammeter clamp is configured to send a signal to the motherboard to detect if the ABS pump is functioning.

The foregoing has outlined rather broadly the more pertinent and important features of the present disclosure so that the detailed description of the invention that follows may be better understood and so that the present contribution to the art can be more fully appreciated. Additional features of the invention will be described hereinafter which form the subject of the claims of the invention. It should be appreciated by those skilled in the art that the conception and the disclosed specific methods and structures may be readily utilized as a basis for modifying or designing other structures for carrying out the same purposes of the present disclosure. It should be realized by those skilled in the art that such equivalent structures do not depart from the spirit and scope of the invention as set forth in the appended claims.

BRIEF DESCRIPTION OF THE SEVERAL VIEWS OF THE DRAWINGS

Other features and advantages of the present invention will become apparent when the following detailed description is read in conjunction with the accompanying drawings, in which.

DETAILED DESCRIPTION OF THE PREFERRED EMBODIMENT

Figure 1A:
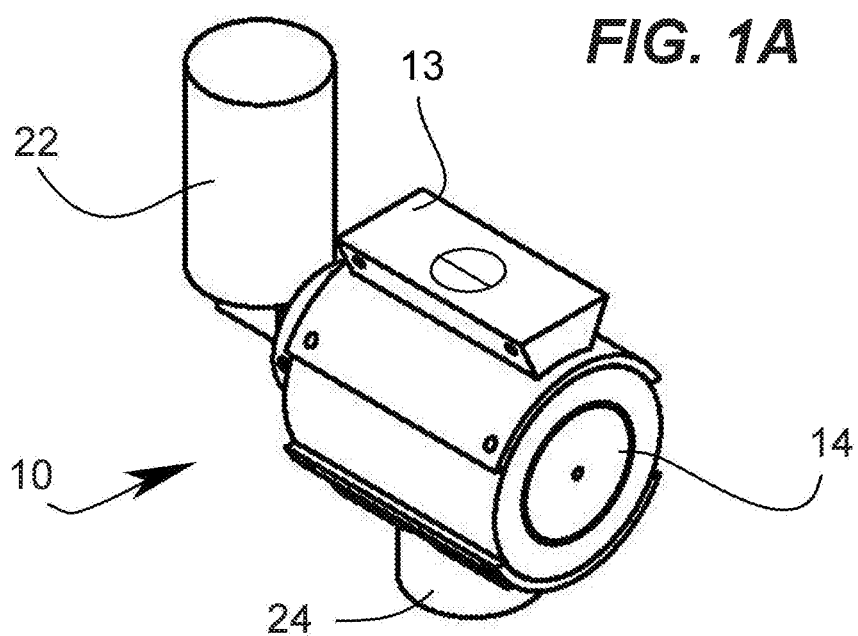
FIG. 1A is an isometric view of an integrated abrasive material dispensing system for a wheeled vehicle according to an embodiment of the present invention.
Figure 1B:
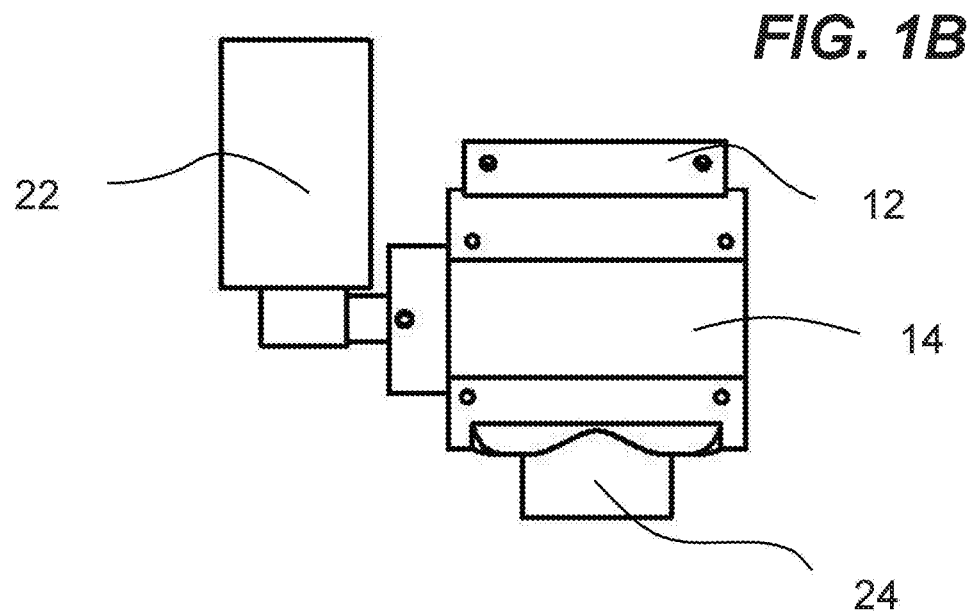
FIG. 1B is a side view of the integrated abrasive material dispensing system for a wheeled vehicle according to an embodiment of the present invention.
Figure 2A:
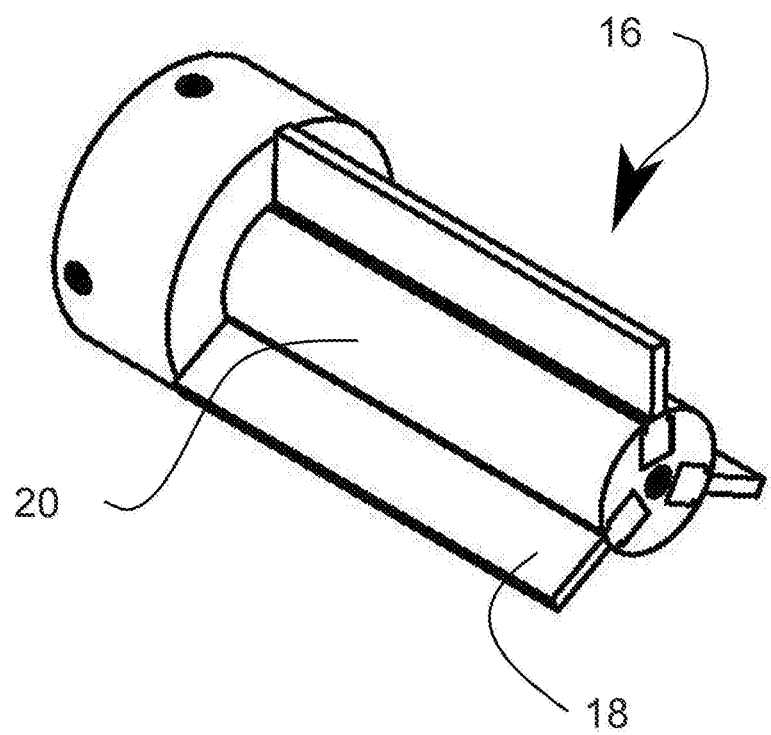
FIG. 2A is an isometric view of a brush roll of the dispensing system according to an embodiment of the present invention.
Figure 2B:
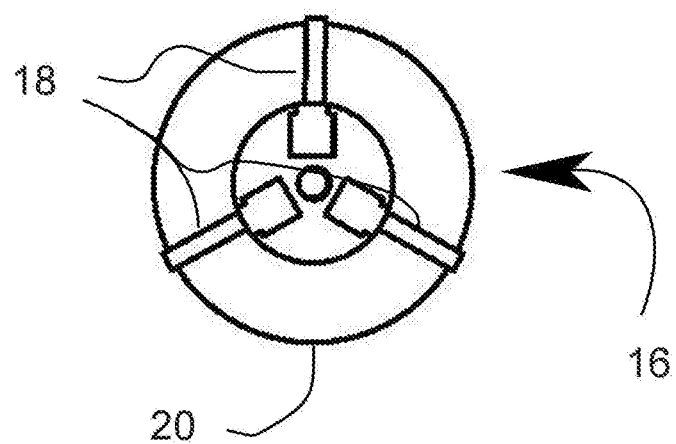
FIG. 2B is a side view of the brush roll according to an embodiment of the present invention.

The following description is provided to enable any person skilled in the art to make and use the invention and sets forth the best modes contemplated by the inventor of carrying out his invention. Various modifications, however, will remain readily apparent to those skilled in the art, since the general principles of the present invention have been defined herein to specifically provide an integrated material abrasive dispensing system for a wheeled vehicle.

In one embodiment of the present invention, the system is configured to deploy abrasive material ahead of the front wheels of a vehicle when needed. The invention is activated manually or automatically depending on the situation. First, if the vehicle is stuck in a snowbank for example, the driver can operate the system via a push button in the front of a control box inside the vehicle. This greatly increases the chances of the driver to be able to get out of this situation without the intervention of a tow truck. Secondly, when the driver tries to brake, but the road conditions make it difficult, the system triggers automatically when the ABS is activated. The components and other features of the invention will be explained in greater detail below.

Referring now to FIGS. 1A-2B, an integrated abrasive dispensing material system 10 for a wheeled vehicle is illustrated. The system 10 comprises of a tank (not shown) configured to hold abrasive material leading and connecting to a hopper 12, wherein the hopper 12 dispenses the abrasive material into dispenser 14, and then out dispensing pipe 24 at the bottom of the dispenser. In one embodiment, the dispenser includes a rotating brush roll 16 having a plurality of bristled flaps 18 extending radially from cylinder 20 (in the hollow interior of the dispenser). In one embodiment, the brush roll 16 is actuated via motor 22. In one embodiment, there are four bristled flaps.

Advantageously, the brush roll 16 controls the flow of the abrasive material which dispenses through the dispensing pipe. One advantage of using bristle flaps 18 is that they can flex around potential clumps of abrasive material without jamming the rotational action of the rotating brush roll 16. Further, the bristle flaps provide a tight seal preventing any abrasive material from trickling down the dispensing pipe when the rotating brush roll 16 is not rotating. The tight seal is due to how the bristle flaps fit in the rotating bush roll 16, as the flaps make contact with the perimeter of the dispenser. In some embodiments, the rotating brush is guided by ball bearings (not shown) which reduces friction on the mechanical parts and ensures long life of the system in cold temperature environments.

In some embodiments, integrated abrasive material dispensing system 10 is bolted into the chassis of the vehicle via a bracket (not shown), preferably under the hood of the vehicle, for instance behind the front bumper, such that one system 10 is placed ahead of each of the two front wheels. In one embodiment, the tank is made from a flexible and insulating material to prevent condensation of the abrasive material. This avoids clumping in the tank and the hopper 12. To further prevent condensation, the bristled flaps 18 always close the system 10 from both the top and the bottom so as to prevent moist air from entering and clumping the abrasive material, which could block its flow and jam the dispenser.

Figure 3:
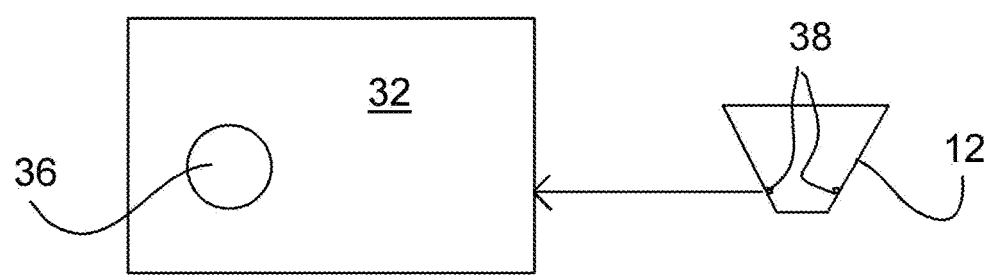
FIG. 3 is a schematic of an abrasive level warning system according to an embodiment of the present invention.
Figure 4:
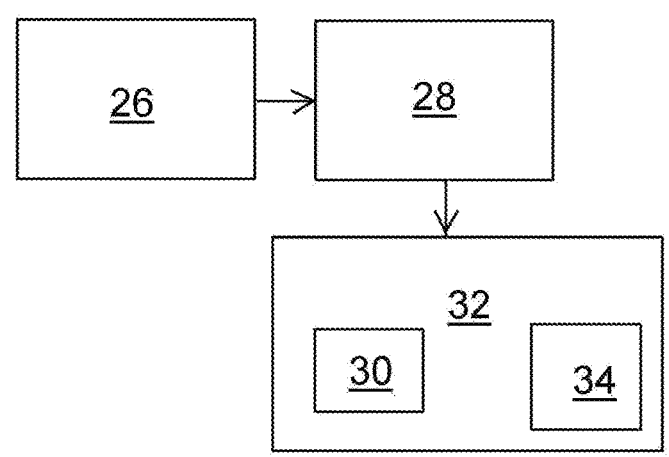
FIG. 4 is a schematic of an electronic component system according to an embodiment of the present invention.
Figure 6:
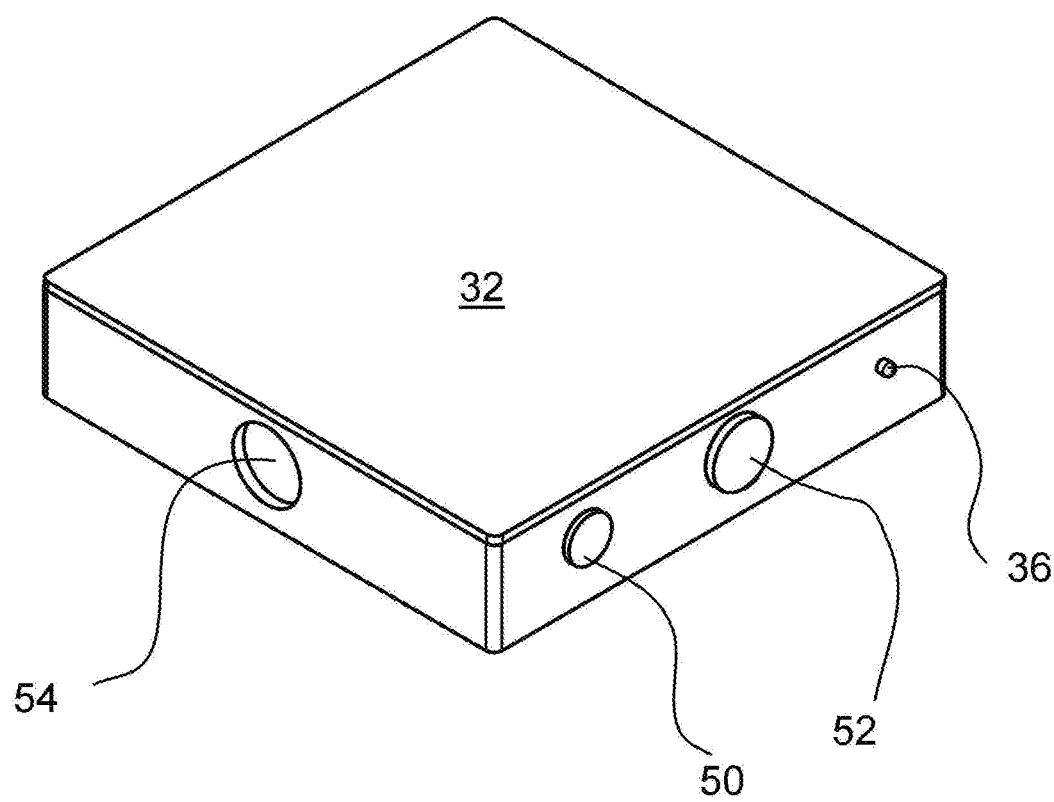

Referring now to FIGS. 3, 4, and 6, a control box 32 is provided having a variety of features. In some embodiments, the control box 32 is located inside the vehicle in which the system is installed. The control box 32 includes a motherboard 30, timer 34, indicator light 36, power on switch 50, manual mode on button 52, and an aperture 54 for passing connection wires. In some embodiments, the indicator light 36 is positioned in front of a control box, such that the indicator light is visible and configured to alert the driver a filling of abrasive material is required. The warning is triggered by way of a simple photo receptor device 38 located inside the hopper 12. When the abrasive material level falls below the level of the photo receptor device 38 it turns on the indicator light 36.

In some embodiments, to detect an inability to brake, an ammeter clamp 26 is installed around one of the motor wires of an ABS pump 28. The ammeter clamp sends a signal to the motherboard 30 which turns on the timer 34 activates the system for approximately half a second. Thus, as long as the ABS pump 28 gives impulses, the countdown timer starts again.

Figure 5A:
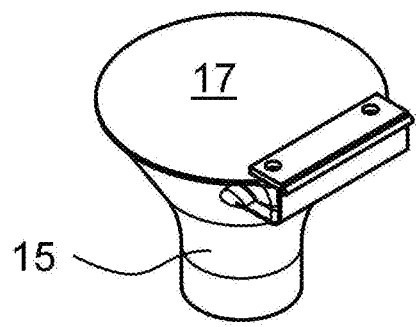
FIG. 5A is an isometric view of a funnel installed on the dispensing system having an alternate motor alignment according to an embodiment of the present invention.
Figure 5B:
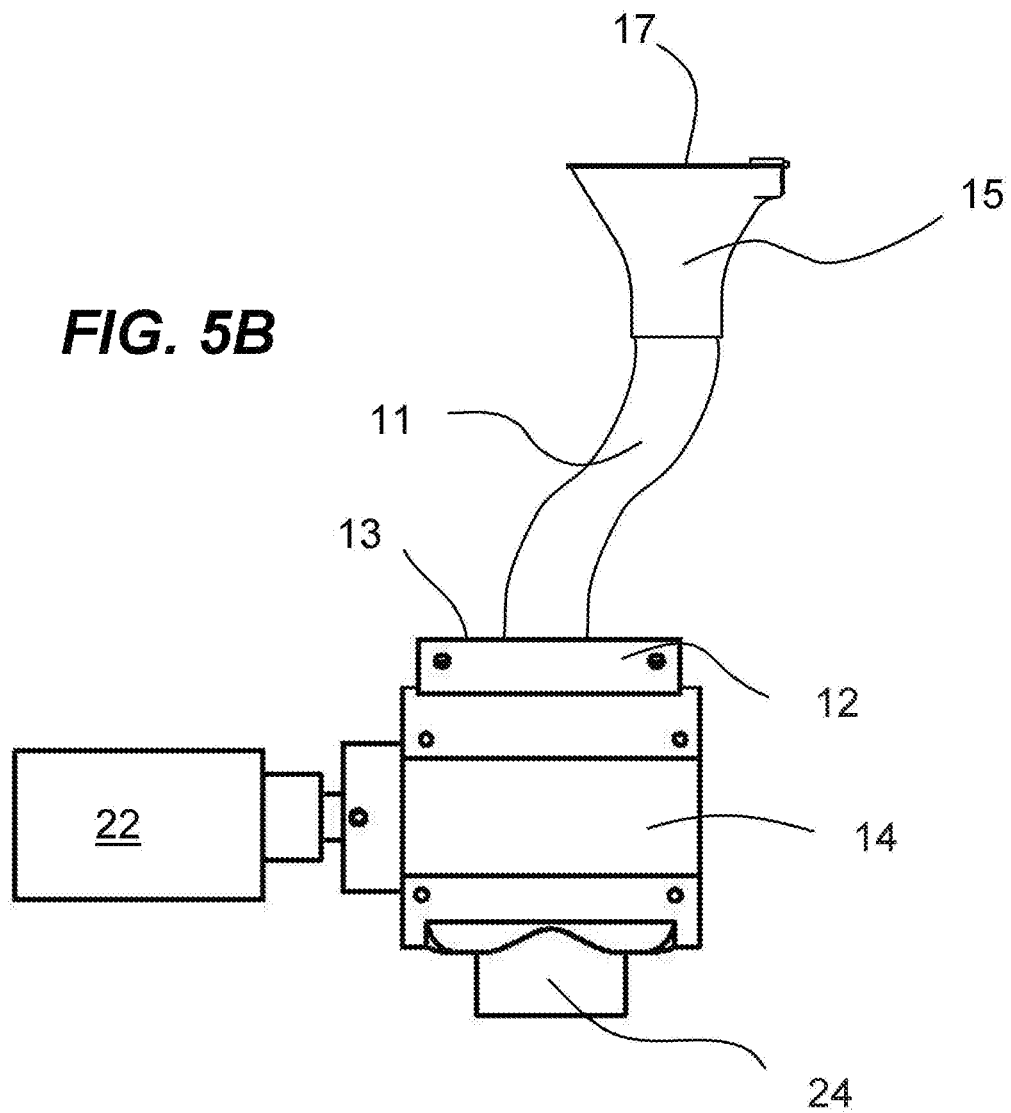
FIG. 5B is a side view of the funnel installed on the dispensing system having an alternate motor alignment according to an embodiment of the present invention; and, FIG. 6 is an isometric view of a control box according to an embodiment of the present invention.

Referring now to FIGS. 5A-B, in some embodiments, the hopper includes a cover 13 having an opening connected to a funnel 15 via hose 11 enable easy abrasive material refills. In some embodiments, a lid 17 is provided on the funnel 15. As shown in FIG. 5B, is an alternative orientation of the motor 22, providing an ease of installation on some vehicles.

Although the invention has been described in considerable detail in language specific to structural features, it is to be understood that the invention defined in the appended claims is not necessarily limited to the specific features described. Rather, the specific features are disclosed as exemplary preferred forms of implementing the claimed invention. Stated otherwise, it is to be understood that the phraseology and terminology employed herein, as well as the abstract, are for the purpose of description and should not be regarded as limiting. Therefore, while exemplary illustrative embodiments of the invention have been described, numerous variations and alternative embodiments will occur to those skilled in the art. Such variations and alternate embodiments are contemplated, and can be made without departing from the spirit and scope of the invention.

It should further be noted that throughout the entire disclosure, the labels such as left, right, front, back, top, bottom, forward, reverse, clockwise, counter clockwise, up, down, or other similar terms such as upper, lower, aft, fore, vertical, horizontal, oblique, proximal, distal, parallel, perpendicular, transverse, longitudinal, etc. have been used for convenience purposes only and are not intended to imply any particular fixed direction or orientation. Instead, they are used to reflect relative locations and/or directions/orientations between various portions of an object.

In addition, reference to "first," "second," "third," and etc. members throughout the disclosure (and in particular, claims) are not used to show a serial or numerical limitation but instead are used to distinguish or identify the various members of the group.

What is claimed is:

1. An integrated abrasive material dispensing system for a wheeled vehicle comprising:
   a hollow dispenser;
   a rotating brush roll having a plurality of flaps, wherein the rotating brush roll is positioned inside the hollow dispenser and is actuated via a motor;
   a dispensing pipe attached to a bottom portion of the hollow dispenser; and,
   a hopper configured to feed abrasive material into the hollow dispenser, wherein the rotating brush controls the flow of the abrasive material exiting the dispensing pipe;
a control box configured to control the integrated abrasive material dispensing system, wherein the control box is positioned inside the vehicle;
the control box includes a motherboard having a timer, the motherboard in electrical communication with an ammeter clamp, wherein the ammeter clamp is installed around a motor wire of an ABS pump of the vehicle such that the ammeter clamp is configured to send a signal to the motherboard to detect if the ABS pump is functioning.

2. The dispensing system of claim 1, wherein the rotating brush roll includes a cylinder and the plurality of flaps extend radially from the cylinder.

3. The dispensing system of claim 1, wherein the plurality of flaps are four bristled flaps.

4. The dispensing system of claim 1, wherein the plurality of flaps are configured to flex around dumps of abrasive material such that the rotation of rotating brush roll is not impeded.

5. The dispensing system of claim 1, wherein the hollow dispenser has an inner perimeter surface and the distal portions of the plurality of flaps make contact with the inner perimeter surface such that a tight seal is formed preventing abrasive material from exiting the dispensing pipe when the rotating brush roll is not rotating.

6. The dispensing system of claim 1, wherein the integrated abrasive material dispensing system is configured to be attached to the vehicle's chassis.

7. The dispensing system of claim 1, wherein the control box includes an indicator light configured to alert a driver of the vehicle that a filling abrasive material is required.

8. The dispensing system of claim 1, wherein the hopper includes a cover.

9. The dispensing system of claim 8, wherein the cover has an opening connected to a funnel via hose enabling abrasive material refills.

* * * * *